(12) United States Patent
Urabe et al.

(10) Patent No.: US 11,189,064 B2
(45) Date of Patent: Nov. 30, 2021

(54) INFORMATION PROCESSING APPARATUS, INFORMATION PROCESSING METHOD, AND NON-TRANSITORY COMPUTER READABLE MEDIUM

(71) Applicant: CANON KABUSHIKI KAISHA, Tokyo (JP)

(72) Inventors: Hirofumi Urabe, Tokyo (JP); Masahiro Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/730,245

(22) Filed: Dec. 30, 2019

(65) Prior Publication Data
US 2020/0219298 A1 Jul. 9, 2020

(30) Foreign Application Priority Data
Jan. 7, 2019 (JP) .............................. JP2019-000549

(51) Int. Cl.
*G06T 11/20* (2006.01)
*G06T 11/00* (2006.01)

(52) U.S. Cl.
CPC .......... *G06T 11/206* (2013.01); *G06T 11/001* (2013.01)

(58) Field of Classification Search
CPC ......... G06T 2207/20208; G06T 11/206; G06T 5/007; G06T 2200/24; G06T 2207/10152; H04N 5/2351; H04N 1/6027; H04N 5/2355; G09G 2320/0271; G09G 2320/0646; G09G 2360/16
See application file for complete search history.

(56) References Cited

U.S. PATENT DOCUMENTS 10,102,787 B2 10/2018 Miura
2015/0365580 A1* 12/2015 Kunkel ............... H04N 5/2352
348/234
(Continued)

FOREIGN PATENT DOCUMENTS

| JP | 04235589 A | 8/1992 |
|----|------------|--------|
| JP | 2008-242812 A | 10/2008 |
| JP | 2010-021893 A | 1/2010 |

(Continued)

OTHER PUBLICATIONS

The above foreign patent documents were cited in the Jun. 9, 2020 Japanese Office Action, without an English Translation, that issued in Japanese Patent Application No. 2019000549.

(Continued)

*Primary Examiner* — Hau H Nguyen
(74) *Attorney, Agent, or Firm* — Cowan, Liebowitz & Latman, P.C.

(57) ABSTRACT

An information processing apparatus according to the present invention includes at least one memory and at least one processor which function as: an acquisition unit configured to acquire information on a luminance level of each pixel at each time position of a moving image; and a generation unit configured to generate, based on the information, a graph that includes a first axis which indicates the time position and a second axis which intersects with the first axis and indicates the luminance level, and indicates the presence/absence of corresponding pixels or a number of corresponding pixels in each coordinate.

25 Claims, 7 Drawing Sheets

(56) References Cited

U.S. PATENT DOCUMENTS

2017/0249528 A1* 8/2017 Ando .................. G06K 9/4642
2018/0035088 A1* 2/2018 Nose .................. H04N 5/23229

FOREIGN PATENT DOCUMENTS

JP     2010-113288 A    5/2010
JP     2017181762 A    10/2017

OTHER PUBLICATIONS

The above foreign patent document was cited in the Sep. 1, 2020 Japanese Office Action, without an English Translation, that issued in Japanese Patent Application No. 2019-000549.

* cited by examiner

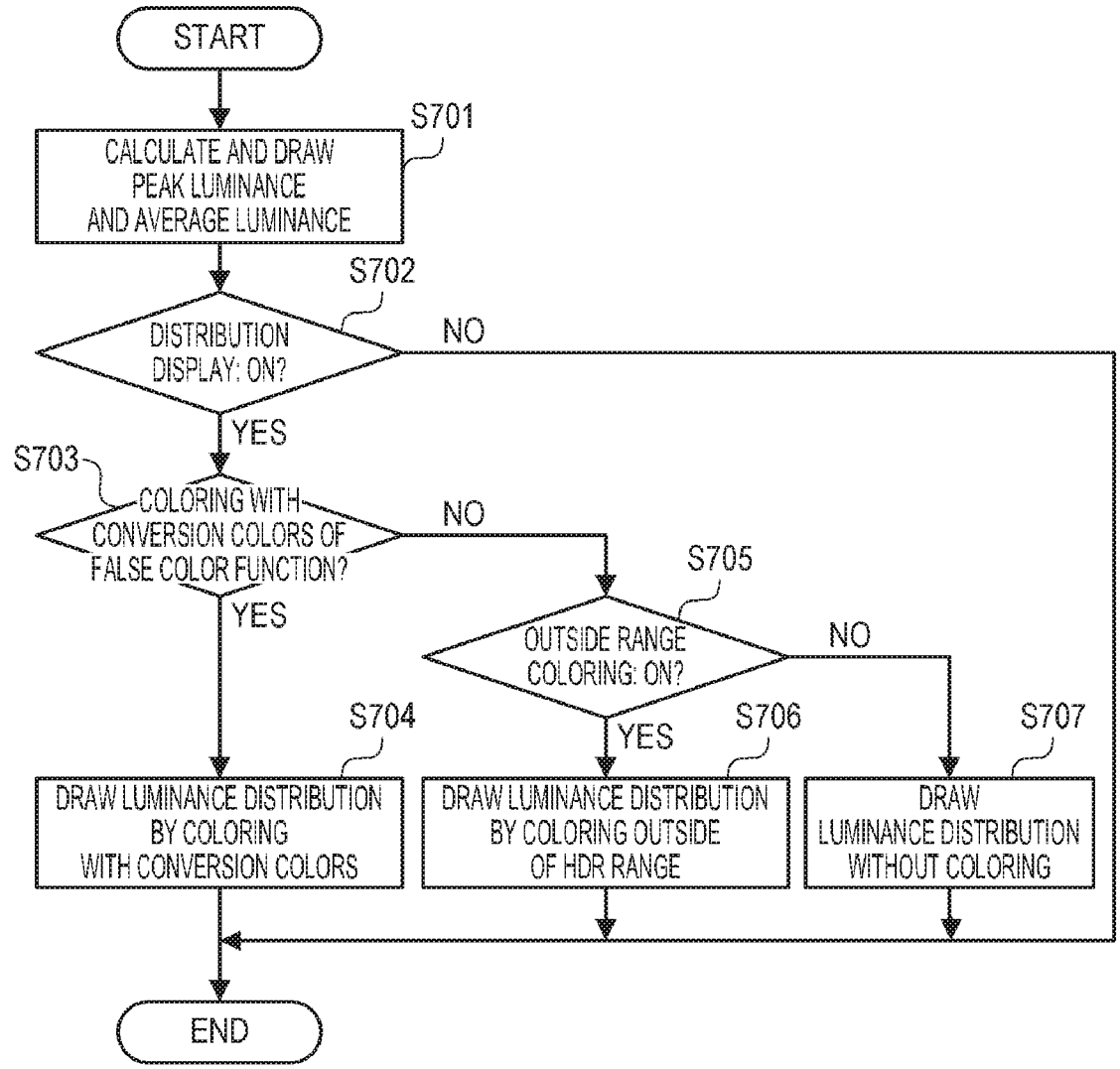

| GRADATION VALUE | NUMBER OF PIXELS | LUMINANCE [cd/m$^2$] |
|---|---|---|
| 1023 | 0 | 1000 |
| 1022 | 0 | 1000 |
| ... | 0 | ... |
| 940 | 1036800 | 1000 |
| ... | 0 | ... |
| 64 | 1036800 | 0 |
| ... | 0 | ... |
| 0 | 0 | 0 |

INFORMATION PROCESSING APPARATUS, INFORMATION PROCESSING METHOD, AND NON-TRANSITORY COMPUTER READABLE MEDIUM

BACKGROUND OF THE INVENTION

Field of the Invention

The present invention relates to an information processing apparatus, an information processing method, and a non-transitory computer readable medium.

Description of the Related Art

As a standard of image data having a wide dynamic range (wide luminance range), various standards, such as perceptual quantizer (PQ) and hybrid log-gamma (HLG) are proposed. The wide dynamic range is also called the high dynamic range (HDR). A conventional dynamic range (dynamic range narrower than HDR), on the other hand, is called the standard dynamic range (SDR). By using each luminance of HDR, a wide image expression, from a very dark portion to a very light portion, can be implemented.

An example of the standard of HDR is HDR10 stipulated by the Consumer Technology Association (CTA) in the United States. In HDR10, the peak luminance (maximum luminance) and the maximum frame average luminance of the entire moving image contents (moving image) are specified as metadata (static metadata). The maximum frame average luminance is the maximum luminance of a plurality of frame average luminance corresponding to a plurality of frames respectively (average luminance of images (frame images) corresponding to the frames).

Another example of a standard of HDR is ST2094-40 stipulated by the Society of Motion Picture and Television Engineers (SMPTE) in the United States. In ST2094-40, the peak luminance and the maximum frame average luminance in each partial period of the moving image are specified as metadata (dynamic metadata). In concrete terms, the peak luminance of each scene or each frame and the maximum frame average luminance of the moving image are specified as the dynamic metadata.

Another example of a standard of HDR is BT.2408-1: Operational Practices in HDR Television Production, stipulated by the International Telecommunications Union (ITU). In BT.2408-1: Operational Practices in HDR Television Production, the influence in the case where the luminance considerably changed and the management of the changes of the peak luminance and the average luminance are described for users.

At the production site of HDR images (images having HDR), a function to individually display the luminance distribution of each frame using a waveform monitor, a luminance histogram or the like is used in order to confirm whether each luminance of HDR is being used. Japanese Patent Application Publication No. 2010-113288 discloses a technique to draw a section of a luminance histogram, in which luminance distribution between frames changed, using a color different from the other sections, so that the user intuitively recognizes the change of the luminance distribution between frames.

Further, a for-business-use display apparatus may include a function to display a graph which indicates the time change of a frame peak luminance (peak luminance of a frame image) and a time change of a frame average luminance. At a production site of HDR images, the time change of the frame peak luminance and the time change of the frame average luminance are confirmed and managed using such a function.

FIG. 10 is an example of a conventional graphic image indicating the time change of the frame peak luminance and the time change of the frame average luminance. In the graphic image 1000 in FIG. 10, a graph 1001, which indicates the time change 1002 of the frame peak luminance and the time change 1003 of the frame average luminance, is drawn. The abscissa of the graph 1001 indicates the time position (frame), and the ordinate of the graph 1001 indicates the luminance. On the upper right in the graphic image 1000, numeric values of the frame peak luminance of the final frame and the frame average luminance are written. On the upper left in the graphic image 1000, numeric values of a peak luminance (maximum content light level) in the entire moving image and the maximum frame average luminance (maximum frame average light level) are written. In some cases, values of a peak luminance and the maximum frame average luminance in a partial period (e.g. period in which the graphic image 1000 is displayed) may be written. This information can be acquired from the metadata (metadata specified by HDR10 or ST2094-40) included in the high-definition multimedia interface (HDMI®) data, for example. This information can also be acquired by analyzing the moving image data itself.

If the technique disclosed in Japanese Patent Application Publication No. 2010-113288 is used, the user can recognize the luminance distribution of each frame and the changes of the luminance distribution during a relatively short period (e.g. two frames). However, the user cannot easily recognize the change of the luminance distribution in a relatively long period (e.g. entire moving image period, period of a scene). For example, the user cannot quickly recognize the number of pixels having a certain luminance (luminance level) which exist at each time position in a relatively long period. If the graphic image 1000 in FIG. 10 is displayed, the user can recognize the time change 1002 of the frame peak luminance and the time change 1003 of the frame average luminance. However, the user cannot recognize the luminance distribution (luminance level distribution) of each frame and the time change of the luminance distribution.

SUMMARY OF THE INVENTION

The present invention provides a technique by which the user can easily (intuitively) recognize the time change of the luminance level distribution during a relatively long period.

The present invention in its first aspect provides an information processing apparatus comprising at least one memory and at least one processor which function as:

an acquisition unit configured to acquire information on a luminance level of each pixel at each time position of a moving image; and a generation unit configured to generate, based on the information, a graph that includes a first axis which indicates the time position and a second axis which intersects with the first axis and indicates the luminance level, and indicates the presence/absence of corresponding pixels or a number of corresponding pixels in each coordinate.

The present invention in its second aspect provides an information processing method comprising:

acquiring information on a luminance level of each pixel at each time position of a moving image; and generating, based on the information, a graph that includes a first axis which indicates the time position and a second axis which intersects with the first axis and indicates the luminance level, and indicates the presence/absence of corresponding pixels or a number of corresponding pixels in each coordinate.

The present invention in its third aspect provides a non-transitory computer readable medium that stores a program, wherein the program causes a computer to execute an information processing method, the information processing method comprising:

acquiring information on a luminance level of each pixel at each time position of a moving image; and generating, based on the information, a graph that includes a first axis which indicates the time position and a second axis which intersects with the first axis and indicates the luminance level, and indicates the presence/absence of corresponding pixels or a number of corresponding pixels in each coordinate.

Further features of the present invention will become apparent from the following description of exemplary embodiments with reference to the attached drawings.

BRIEF DESCRIPTION OF THE DRAWINGS

FIG. 6 is an example of the setting information according to the embodiment;

FIG. 7 is a flow chart illustrating a processing flow example of the display apparatus according to the embodiment;

DESCRIPTION OF THE EMBODIMENTS

An embodiment of the present invention will be described. Here an example when a display apparatus includes an information processing apparatus according to the embodiment will be described, but the information processing apparatus according to the embodiment may be an apparatus (e.g. personal computer) that is separate from the display apparatus.

Figure 1:
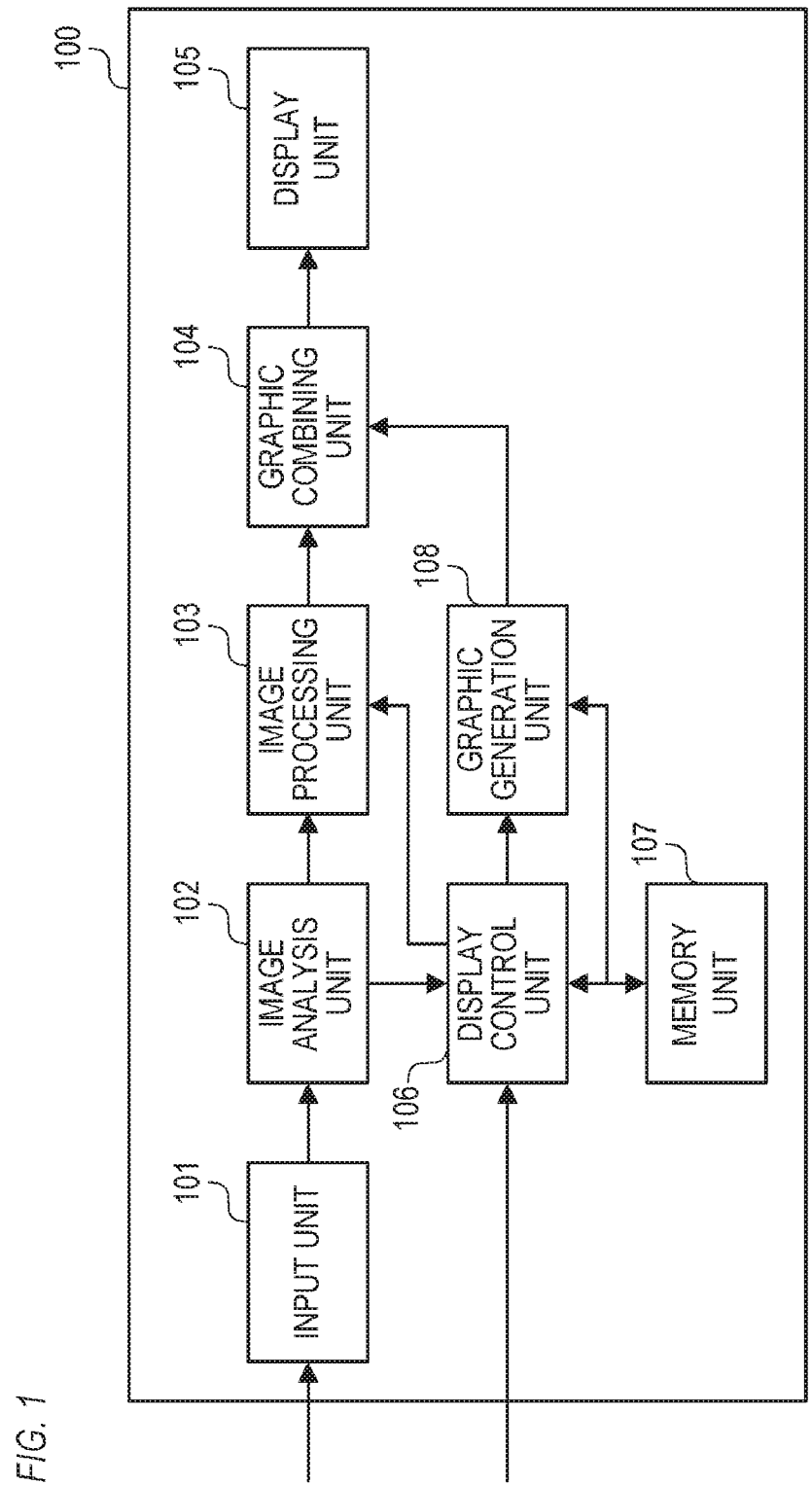
FIG. 1 is a block diagram illustrating a configuration example of a display apparatus according to the embodiment.

FIG. 1 is a block diagram illustrating a configuration example of a display apparatus according to the embodiment. The display apparatus 100 in FIG. 1 includes an input unit 101, an image analysis unit 102, an image processing unit 103, a graphic combining unit 104, a display unit 105, a display control unit 106, a memory unit 107 and a graphic generation unit 108.

The input unit 101 acquires target moving image data, and outputs the target moving image data to the image analysis unit 102. The target moving image data is, for example, high dynamic range (HDR) moving image data that conforms to a HDR10, HDR10+, PQ or HLG, and represents a moving image (moving contents). The target moving image data may be a standard dynamic range (SDR) moving image data conforming to a gamma 2.2, for example. In this embodiment, the input unit 101 acquires frame image data (image data representing an image corresponding to a frame (Frame image)) from an external apparatus for each frame of the target moving image (moving image represented by the target moving image data). Then the input unit 101 outputs the acquired frame image data to the image analysis unit 102. The input unit 101 is an input terminal conforming to the serial digital interface (SDI) standard or the high-definition multimedia interface (HDMI®) standard, for example. The external apparatus is an imaging apparatus, a regeneration apparatus or the like. The display apparatus 100 may include a storage unit which stores moving image data, and the input unit 101 may acquire the moving image data recorded in the storage unit from the storage unit as the target moving image data.

The image analysis unit 102 acquires the target moving image data outputted by the input unit 101, analyzes the target moving image data, outputs the analysis result to the display control unit 106, and outputs the target moving image data to the image processing unit 103.

In concrete terms, the image analysis unit 102 analyzes the target moving image data and acquires the pixel information on the luminance (absolute luminance; luminance level) of each pixel at each time position (each frame) of the target moving image as the analysis result. In this embodiment, the image analysis unit 102 analyzes the frame image data outputted from the input unit 101. The pixel information indicates a number of pixels, which exist in the frame image represented by the frame image data, for each of possible gradation values of the frame image data outputted by the input unit 101. If the gradation value of the frame image data is a 10-bit value (0 to 1,023), the pixel information indicates a number of pixels which exist for each of the gradation values 0 to 1,023.

Further, from the target moving image data the image analysis unit 102 acquires metadata corresponding to the target moving image data, and outputs the acquired metadata to the display control unit 106 as the analysis result. The metadata is, for example, data stored in InfoFrame specified in the HDMI, or ancillary (ANC) data stored in the blanking unit specified in the SDI.

The image processing unit 103 generates the processed moving image data by performing image processing on the target moving image data outputted from the image analysis unit 102. Then the image processing unit 103 outputs the processed moving image data to the graphic combining unit 104.

In concrete terms, a gradation curve (correspondence between the gradation value and luminance; gradation characteristic) is set from the display control unit 106 to the image processing unit 103. The gradation curve of HLG, PQ or the like is set to display (process) the high dynamic range (HDR) image. The gradation curve of gamma 2.2 or the like is set to display (process) a standard dynamic range (SDR) range. Such a gradation range as a limited range and a full range is also set from the display control unit 106 to the image processing unit 103. The limited range and the full range are gradation ranges to assign a luminance range that is set (such luminance ranges of HLG and PQ: original range). The limited range is a part of the range of the possible gradation values of the target moving image data, and the full range is the entire range of the possible gradation values of the target moving image data. The image processing unit 103 converts each gradation value of the target moving image data in accordance with the gradation curve and the gradation range that are set (gradation conversion processing).

There is a function (display method) to display a moving image with compressing the original range. This function is often used to display HDR images. In this embodiment, the display control unit 106 also sets the luminance range (HDR range) after compression to the image processing unit 103. In accordance with the HDR range that is set, the image processing unit 103 converts each gradation value of the target moving image data, so that the gradation values corresponding to the luminance in the original range are converted into the gradation values corresponding to the luminance in the HDR range (mapping processing). Here a case where the HLG is set, the original range is a luminance range 0 to 1,000 $cd/m^2$, and the HDR range 0 to 600 $cd/m^2$ is set, will be considered. In this case, the gradation values in the luminance range 0 to 600 $cd/m^2$ are not converted, and the gradation values corresponding to the luminance higher than 600 $cd/m^2$ are converted into a gradation values corresponding to 600 $cd/m^2$ (upper limit luminance) (clip processing).

In order to assist confirming the luminance distribution (luminance level distribution) of an image, a false color function (display method), which displays the image after performing processing to convert the color of each pixel into a conversion color in accordance with the luminance of the pixel, is used. In this embodiment, the display control unit 106 also sets enable/disable of the false color function to the image processing unit 103. If the false color function is enabled, the display control unit 106 notifies the correspondence between the luminance (luminance range) and the conversion color to the image processing unit 103. According to the notified correspondence, the image processing unit 103 converts the color of each pixel of the target moving image data into the respective conversion color (color conversion processing).

The graphic combining unit 104 generates combined moving image data by combining graphic data outputted by the graphic generation unit 108 with the processed moving image data (each frame image data) outputted by the image processing unit 103. Then the graphic combining unit 104 outputs the combined moving image data to the display unit 105. If the graphic data is not outputted by the graphic generation unit 108, the graphic combining unit 104 outputs the processed moving image data to the display unit 105. The graphic data is image data representing such a graphic image as an onscreen display (OSD) image. The combined moving image data is a moving image (combined moving image) generated by combining a graphic image with the processed moving image (moving image represented by the processed moving image data).

The display unit 105 displays a moving image, based on the moving image data (combined moving image data or processed moving image data) outputted by the graphic combining unit 104, on the display surface. The display unit 105 is a liquid crystal display unit having a liquid crystal panel and a backlight unit, or an organic EL display panel, for example.

The display control unit 106 controls processing of each block of the display apparatus 100. The memory unit 107 stores programs and parameters. For example, the display control unit 106 is an arithmetic processing circuit which controls processing of each block of the display apparatus 100 by executing the programs stored in the memory unit 107. The display control unit 106 may acquire operation information corresponding to user operation which the user performed via buttons or the like (not illustrated) disposed on the display apparatus 100. Further, the display control unit 106 may switch control and perform detailed control setting in accordance with the operation information.

In this embodiment, the display control unit 106 controls the processing by the image processing unit 103 and the graphic generation unit 108 based on the analysis result (pixel information) outputted by the image analysis unit 102 and the user operation on the display apparatus 100. In concrete terms, according to the user operation (operation information), the display control unit 106 determines such setting information as the gradation curve (e.g. HLG, PQ, gamma 2.2), the gradation range (e.g. limited range, full range), the HDR range, and enable/disable of the false color function. The display control unit 106 outputs (sets) the determined setting information to the image processing unit 103. Further, the display control unit 106 outputs (sets) the determined setting information and the analysis result which is outputted by the image analysis unit 102 to the graphic generation unit 108. Immediately after starting the display apparatus 100, the initial information (predetermined information) of the setting information is set, or a previous setting is continued.

The graphic generation unit 108 generates graphic data and outputs the graphic data to the graphic combining unit 104. In this embodiment, based on the analysis result (pixel information) outputted by the display control unit 106, the graphic generation unit 108 generates a graph having a time axis which indicates the time position (frame) of the target moving image and a luminance axis which intersects with the time axis, and indicates the luminance of the target moving image. In concrete terms, based on the analysis result and the setting information, the graphic generation unit 108 generates the graphic data which represents the graphic image in which the above-mentioned graphic is drawn. In this embodiment, a corresponding number of pixels is indicated by each coordinate of the graph. In other words, the above-mentioned graph indicates the time change of the luminance distribution of the target moving image during a relatively long period of time.

Figure 2:
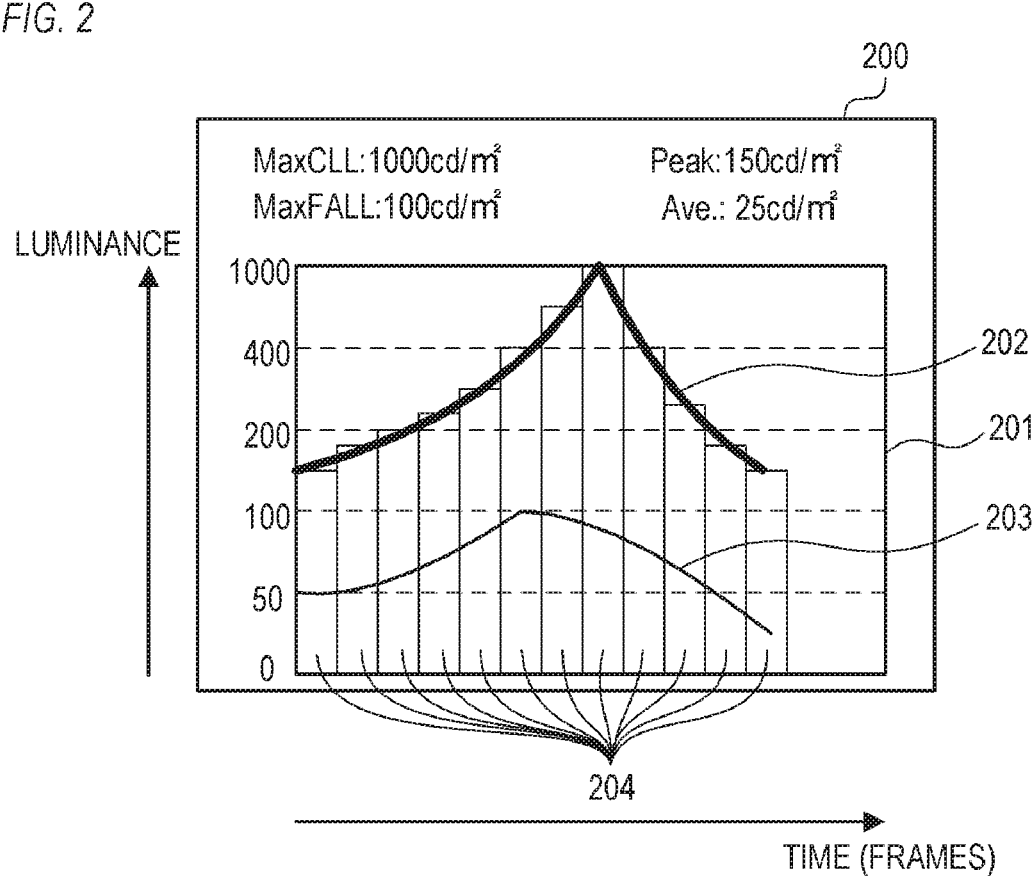
FIG. 2 is a diagram illustrating an example of a graphic image according to the embodiment.

FIG. 2 is an example of a graphic image according to this embodiment. FIG. 2 is an example when the gradation curve is HLG and the original luminance range is 0 to 1000 $cd/m^2$. In the graphic image 200 in FIG. 2, a graph 201, which indicates the time change 202 of the frame peak luminance of the target moving image and the time change 203 of the frame average luminance of the target moving image, is drawn. The frame peak luminance is a peak luminance (maximum luminance; maximum luminance level, peak luminance level) of the frame image, and the frame average luminance is an average luminance (average luminance level) of the frame image. The abscissa of the graph 201 is the time axis, and the ordinate of the graph 201 is the luminance axis. In the upper right in the graphic image 200, the numeric values of the frame peak luminance and the frame average luminance of the final frame are written. On the upper left in the graphic image 200, the numeric values of the peak luminance (maximum content light level) of the entire target moving image and the maximum frame average luminance (maximum frame average light level) are written. The maximum frame average luminance is the maximum luminance of a plurality of frame average luminance corresponding to a plurality of frames respectively. The numeric values of the peak luminance and the maximum frame average luminance in a partial period, such as a period when the graphic image 200 is displayed, may be written. This information can be acquired from metadata (metadata specified by HDR10 and ST2094-40) included in the high-definition multimedia interface (HDMI®) data. This information may be acquired by analyzing the moving image data itself.

In this embodiment, the time change of the luminance distribution is indicated using the region 204. In concrete terms, a number of corresponding pixels is indicated at each coordinate of the region 204. The time change 202 of the frame peak luminance may not be drawn, since the frame peak luminance can be recognized by the luminance distribution. The time change 203 of the frame average luminance, the numeric values on the upper right in the graphic image 200, and the numeric values on the upper left in the graphic image 200 may also be omitted.

Figure 3:
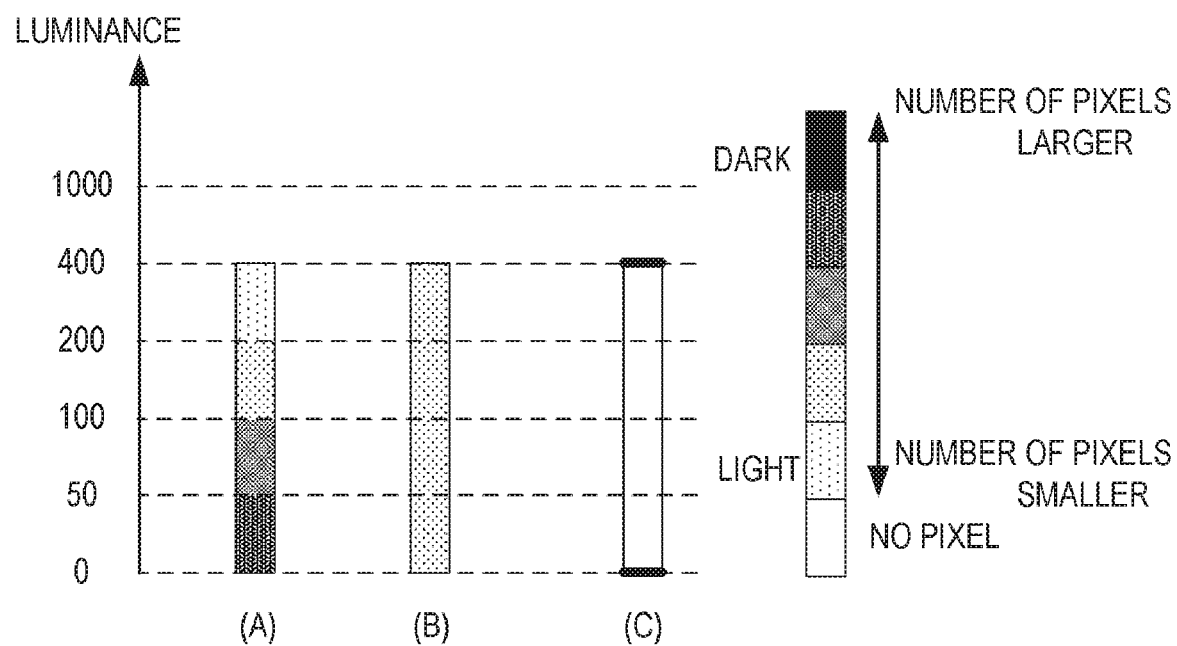
FIG. 3 is a diagram illustrating an example of the way of indicating the luminance distribution according to the embodiment.

FIG. 3 is an example of the indication of the luminance distribution according to this embodiment. In this embodiment, a number of pixels is indicated by density, as illustrated in FIG. 3. In the example in FIG. 3, coordinates where fewer pixels exist are drawn with a lighter color, coordinates where more pixels exist are drawn with a darker color, and coordinates where no pixels exist are not drawn. For example, white of which RGB values are (255, 255, 255) is set for coordinates where no pixels exist, gray of which RGB values are (192, 192, 192) is set for coordinates where few pixels exist, and black of which RGB values are (0, 0, 0,) is set for coordinates where many pixels exist.

FIG. 3 is an example when the peak luminance is 400 $cd/m^2$. In the case of (A) in FIG. 3, pixels exist in four luminance ranges of 0 to 50 $cd/m^2$, 50 to 100 $cd/m^2$, 100 to 200 $cd/m^2$ and 200 to 400 $cd/m^2$ respectively. There are more pixels having low luminance than pixels having high luminance. In concrete terms, a number of pixels in the 0 to 50 $cd/m^2$ range is highest, a number of pixels in the 50 to 100 $cd/m^2$ range is higher than a number of pixels in the 100 to 200 $cd/m^2$ range, and a number of pixels in the 200 to 400 $cd/m^2$ range is the lowest. In the case of (B) in FIG. 3, pixels exist in the luminance range of 0 to 400 $cd/m^2$, and the pixels having each luminance evenly exist. In the case of (C) in FIG. 3, only the pixels having 0 $cd/m^2$ and pixels having 400 $cd/m^2$ exist, and no pixels having other luminance exist.

The method of determining the density is not especially limited. The density may be determined in accordance with the ratio of a number of pixels to the total number of pixels of the frame image, so that the darkest color is used when the ratio of the number of pixels to the total number of pixels of the frame image is at least 10%, and the color becomes lighter as this ratio is lower. The density may be determined in accordance with a number of pixels, so that the darkest color is used when a number of pixels is at least 100, and the color becomes lighter as a number of pixels is lower. The density may be determined in accordance with a number of pixels and a ratio, so that the darkest color is used when a number of pixels is at least 100, and a color having a density, determined by multiplying the maximum density by the ratio, which is the "number of pixels/100" is used when a number of pixels is 99 or less.

Figure 4:
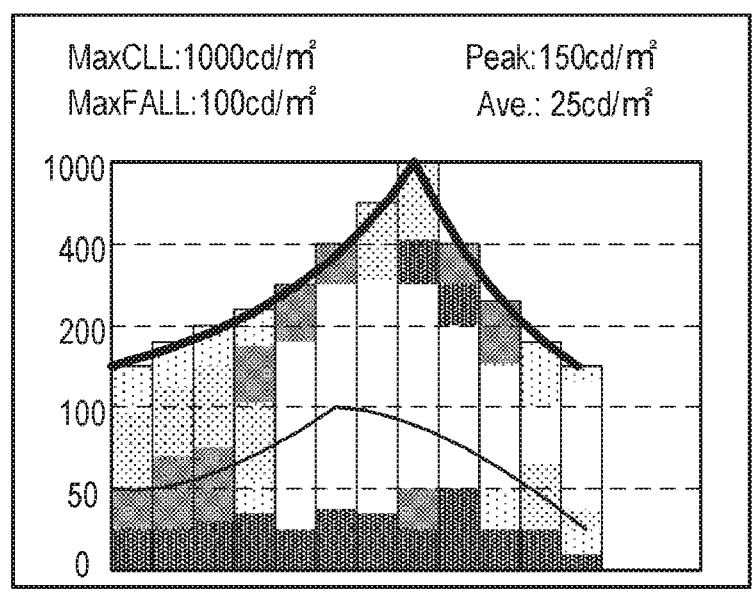
FIG. 4 is a diagram illustrating an example of a graphic image according to the embodiment.

FIG. 4 is an example of the graphic image in the state where a number of pixels is indicated by the density. In the first four frames, pixels exist in all the luminance ranges up to the peak luminance, and each luminance range is drawn by a color having a density in accordance with a number of pixels. In the fifth and subsequent frames, pixels having an intermediate luminance do not exist, and only pixels having a high luminance and pixels having low luminance exist, that is, the high luminance portion and the low luminance portion are drawn by colors having a density in accordance with a number of pixels. By displaying the graphic image in FIG. 4, the user can confirm the luminance distribution of each frame by density during a relatively long period of the target moving image, whereby the amount and luminance of the pixels in each frame can be easily (intuitively) recognized.

Figure 11:
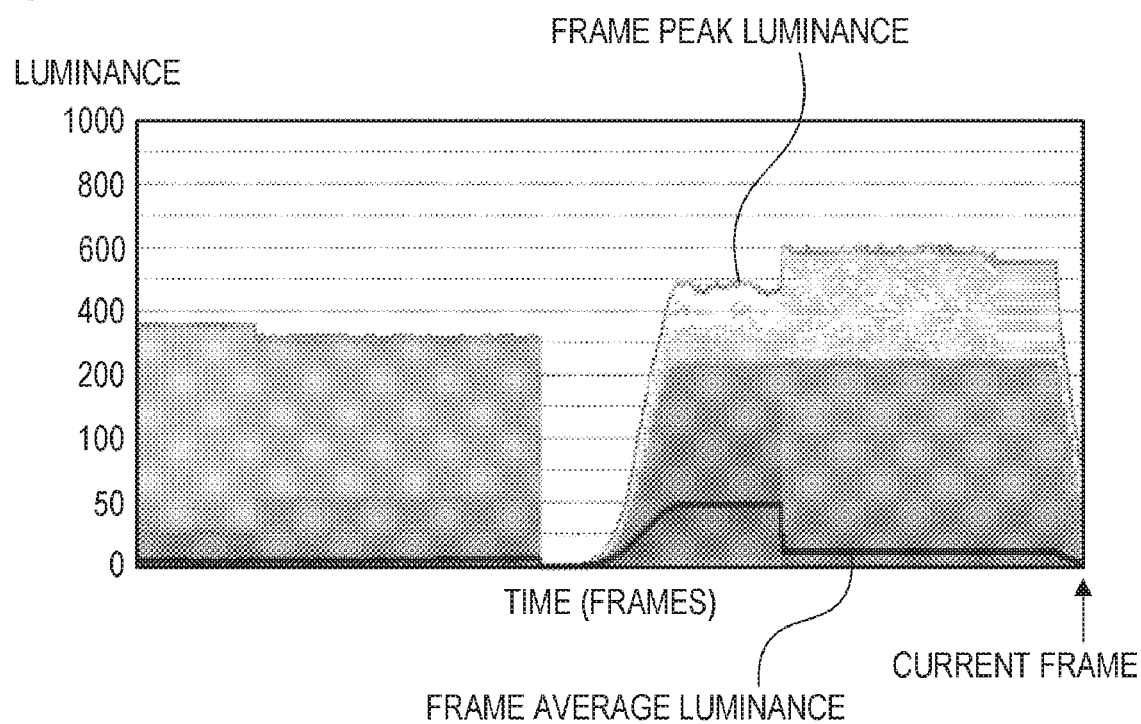
FIG. 11 is a diagram illustrating an example of a graphic image according to the embodiment.

In FIG. 4, the width of each frame is indicated as wide to assist understanding of the present invention. But actually, it is preferable that the width of each frame is narrower, as indicated in FIG. 11, since the time change during a long period of time can be confirmed all at once. FIG. 11 is another example of the graphic image according to this embodiment.

A number of pixels may be indicated by the change of colors other than by density. For example, as a number of pixels is smaller, the color of the portion to be drawn may be closer to blue, and as a number of pixels is larger, the color of the portion to be drawn may be closer to red. In other words, at least one of hue, chroma (saturation) and brightness (lightness) is changed in accordance with a number of pixels, so that the user can recognize the change of a number of pixels in the luminance axis direction and/or the time axis direction. For example, in the case of displaying the graphic image in monochrome, only brightness is changed in accordance with a number of pixels.

Figure 5A:
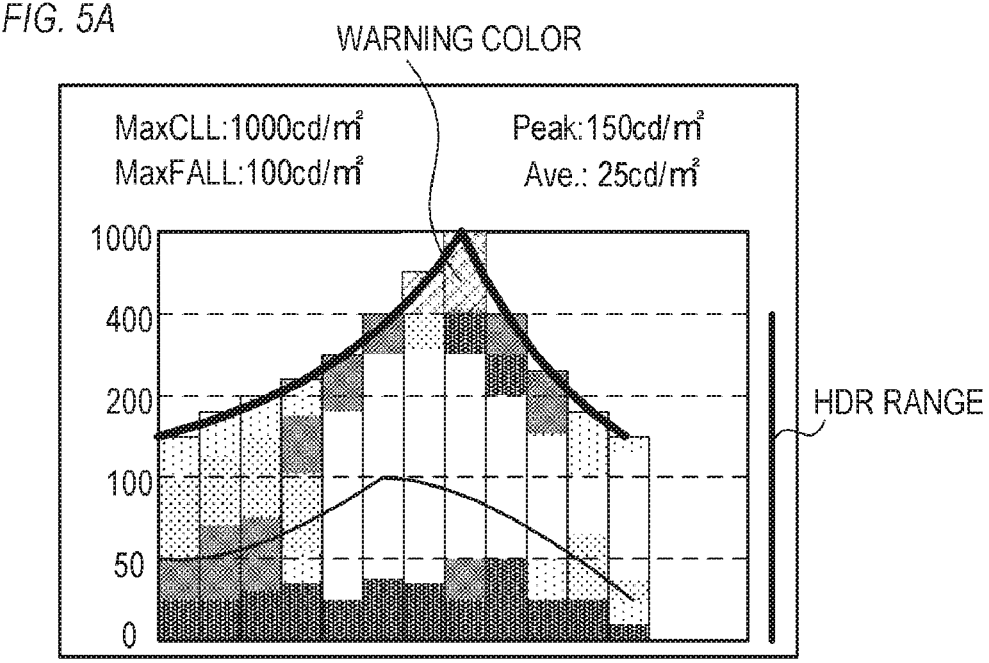
FIG. 5A and FIG. 5B are diagrams illustrating an example of the graphic image according to the embodiment.
Figure 5B:
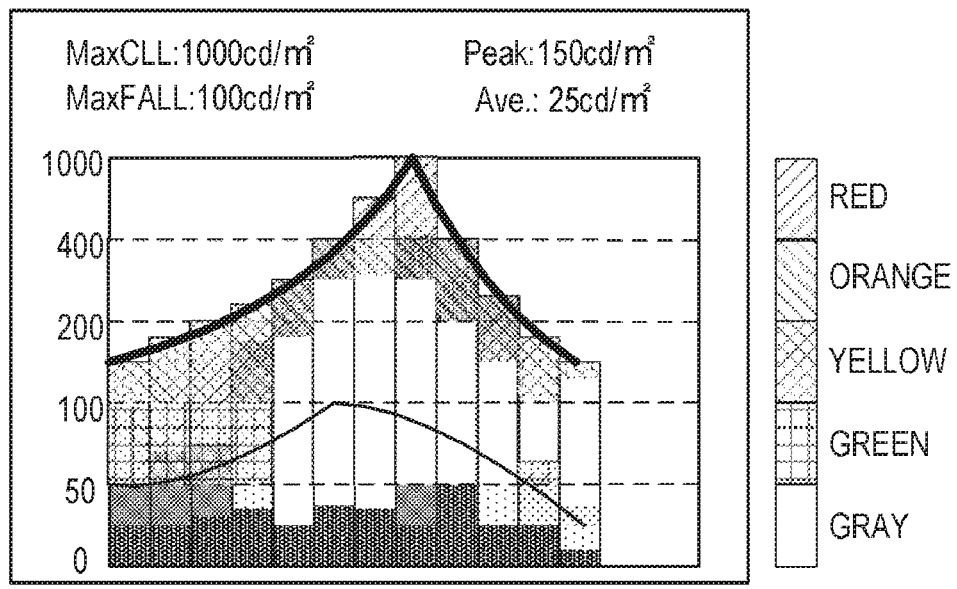

Coordinates at which a corresponding pixel exists and which corresponds to the luminance within a predetermined range may be indicated by a predetermined color. FIG. 5A and FIG. 5B are examples of the graphic image where coordinates corresponding to a luminance within a predetermined range are indicated by a predetermined color. In FIG. 5A and FIG. 5B, a number of pixels is indicated by the density, just like FIG. 4.

FIG. 5A is an example when coordinates, at which corresponding pixels exist and which correspond to the luminance outside the HDR range, are colored with a predetermined color (warning color). In the example in FIG. 5A, the HDR range 0 to 400 $cd/m^2$ is set. In FIG. 5A, coordinates at which corresponding pixels exist and which correspond to a luminance higher than 400 $cd/m^2$ are colored with a warning color (density is not changed). By displaying the graphic image in FIG. 5A, the user can check the portion colored with the warning color, and easily (intuitively) recognize that the luminance outside the HDR range is used.

FIG. 5B is an example when coordinates at which corresponding pixels exist are colored with a conversion color (conversion color according to the luminance corresponding to the coordinates). In FIG. 5B, gray corresponds to 0 to 50 $cd/m^2$, green corresponds to 50 to 100 $cd/m^2$, yellow corresponds to 100 to 200 $cd/m^2$, orange corresponds to 200 to 400 $cd/m^2$, and red corresponds to 400 to 1,000 $cd/m^2$ as the conversion colors. Therefore, coordinates at which corresponding pixels exist and which correspond to 0 to 50 $cd/m^2$ are colored with gray. The density is the same as the case in FIG. 5A, and the density is changed in accordance with a number of pixels in each color. For example, in the green range in 50 to 100 $cd/m^2$, green, of which RGB values are (0, 255, 0), may be set for coordinates where a number of pixels is low, and dark green, of which RGB values are (0, 100, 0) may be set for coordinates where a number of pixels is high. Coordinates which correspond to another luminance are also colored with a conversion color corresponding to this other luminance. By displaying the graphic image in FIG. 5B, the user can check the density and the color of each portion (each coordinate), and more easily (intuitively) recognize the luminance distribution.

Enable/disable of coloring in FIG. 5B may be switched in accordance with the enable/disable of the false color function, so that the coloring in FIG. 5B is performed when the false color function is enabled, and the coloring in FIG. 5B is not performed when the false color function is disabled. The coloring in FIG. 5B may be performed regardless whether the false color function is enabled/disabled. In FIGS. 5A and 5B, the luminance distribution is colored, but a similar coloring as the luminance distribution may be performed for the frame peak luminance or the frame average luminance.

Further, in accordance with the user operation, enable/disable of drawing the luminance distribution (drawing density in the regions 204 in FIG. 2), enable/disable of coloring outside the HDR range (FIG. 5A), enable/disable of coloring with conversion colors of the false color function (FIG. 5B) and the like may be switched. FIG. 6 is a table indicating an example of the setting information related to the generation of the graph according to this embodiment. In the example in FIG. 6, for the setting information of the setting item "distribution display", "ON" is set if the luminance distribution is drawn, or "OFF" is set if the luminance distribution is not drawn. For the setting information of the setting item "false color coloring", "false color interlocking" is set if coloring is performed with the conversion colors in accordance with (interlocking) with the enable setting of the false color function, "ON" in set if coloring with the conversion colors is always performed, or "OFF" is set if coloring with the conversion colors is not performed. For the setting information of the setting item "outside range coloring", "ON" is set if coloring of outside the HDR range is performed, or "OFF" is set if coloring outside the HDR range is not performed. In accordance with the user operation to the display apparatus 100 (operation information), the display control unit 106 sets this setting information in the graphic generation unit 108.

FIG. 7 is a flow chart illustrating a processing flow example of the display apparatus 100. For example, in a state where the generation (display) of the graph on the time change of the frame peak luminance and the like is enabled, the processing in FIG. 7 starts when the frame image data acquired by the input unit 101 is updated, and the analysis result by the image analysis unit 102 is notified to the graphic generation unit 108. The processing flow in FIG. 7 also starts when the setting information (e.g. gradation curve, gradation range, HDR range, enable/disable of false color function) is changed by the user operation, and the setting information after the change is notified to the graphic generation unit 108.

In step S701, the graphic generation unit 108 calculates the frame peak luminance and the frame average luminance of the target frame image data (processing target frame image data; frame image data outputted by the image analysis unit 102), and draws graphs thereof. In other words, in this embodiment, a plurality of frame image data are sequentially acquired (for each frame) by the input unit 101, and the graphs of the information on the plurality of frame image data are sequentially drawn.

A concrete example of a method of determining the frame peak luminance and the frame average luminance will be described.

The graphic generation unit 108 converts each gradation value of the target frame image data into a luminance value based on the analysis result (pixel information) and the setting information (gradation curve and gradation range) outputted by the display control unit 106.

Figures 8, 9:
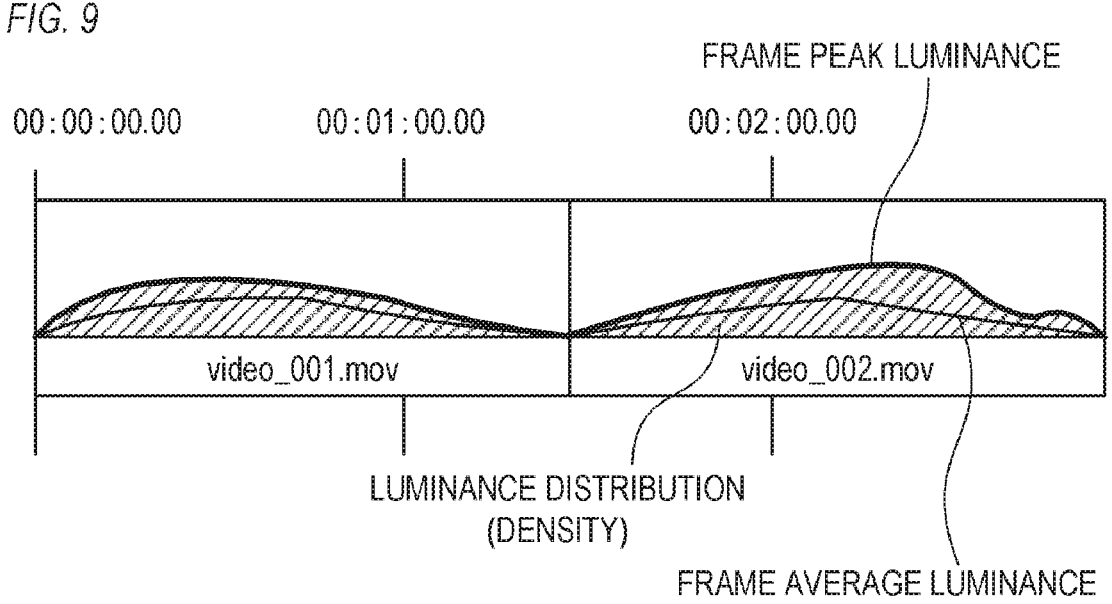
FIG. 8 is an example of correspondence of a gradation value, a number of pixels and luminance according to the embodiment.
FIG. 9 is a diagram illustrating an example of a graph according to the embodiment.
Figure 10:
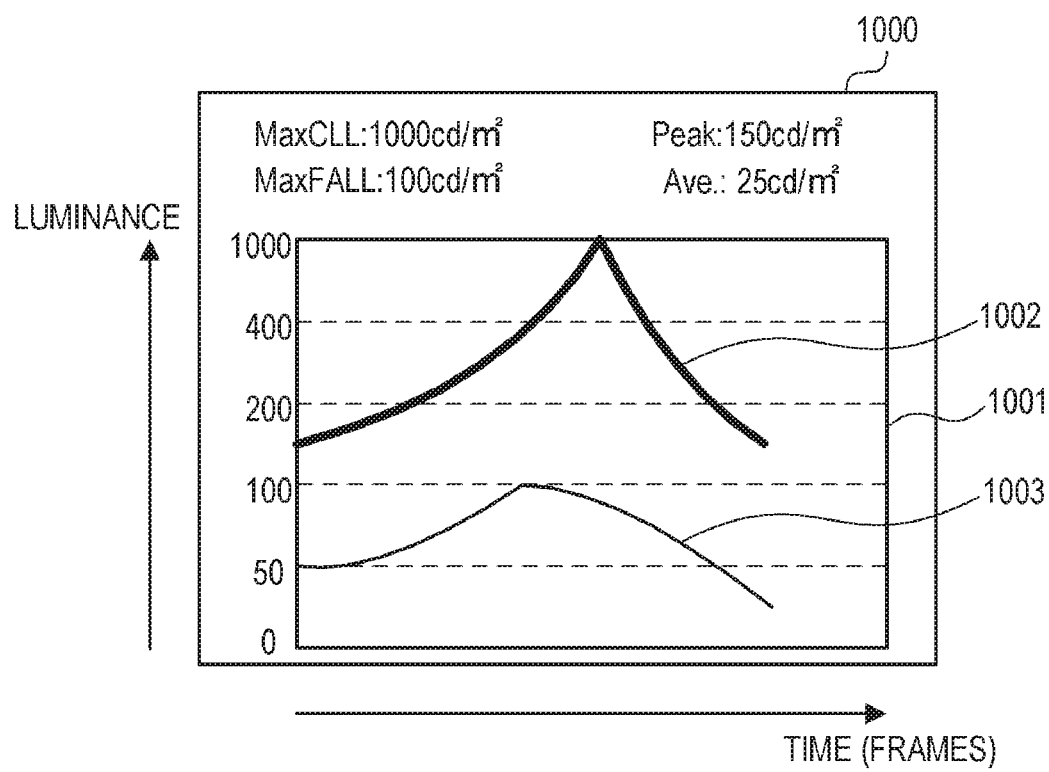
FIG. 10 is a diagram illustrating an example of a conventional graphic image.

FIG. 8 is an example of correspondence of the pixel information (correspondence between the gradation value and a number of pixels), the gradation value and the luminance after the conversion. FIG. 8 is an example when the resolution of the frame image (a number of pixels in the horizontal direction×a number of pixels in the vertical direction) represented by the target frame image data is 1,920×1,080 pixels, that is, when the total number of pixels of the frame image is 2,073,600 pixels. Further, FIG. 8 is an example when the gradation value of the target frame image data is a 10-bit value (0 to 1,023). In FIG. 8, a number of pixels having the gradation value 940 is 1,036,800, and a number of pixels having the gradation value 64 is 1,036,800.

Here it is assumed that HLG is set as the gradation curve, and the limited range of the gradation value 64 to the gradation value 940 is set. Therefore, the graphic generation unit 108 converts the gradation range of the gradation value 64 to the gradation value 940 into the luminance range of HLG (luminance range of 0 cd/m$^2$ to 1000 cd/m$^2$). In the gradation range of the gradation value 64 to the gradation value 940, the change of the luminance with respect to the change of the gradation values follows the HLG. Further, the graphic generation unit 108 converts the gradation values smaller than 64 into 0 cd/m$^2$, and the gradation values larger than 940 into 1,000 cd/m$^2$ (clip processing).

A plurality of tables, as indicated in FIG. 8 (a plurality of tables corresponding to a plurality of combinations between any one of a plurality of gradation curves and any one of a plurality of gradation ranges), may be provided, so that the above-mentioned conversion is performed using a table corresponding to the setting information of the gradation curve and the gradation range. The above conversion may be performed using a calculation formula corresponding to the setting information of the gradation curve and the gradation range, out of a plurality of calculation formulae corresponding to the plurality of combinations.

In FIG. 8, the luminance range 0 cd/m to 1,000 cd/m$^2$ is used for the luminance range of HLG, but the luminance specified in HLG is a relative luminance, and the luminance range (absolute luminance range) of HLG can be changed. For example, the luminance range of HLG may be changed to a luminance range of 0 cd/m$^2$ to 2,000 cd/m$^2$. If the luminance range of HLG changes, the correspondence between the gradation value and the luminance after the conversion also change.

After the conversion, the graphic generation unit 108 determines a largest gradation value where pixels exist based on the pixel information. Then the graphic generation unit 108 determines the luminance (luminance after the conversion) corresponding to the determined gradation value as the frame peak luminance. In the example in FIG. 8, the largest gradation value where pixels exist is 940, and the gradation value 940 is converted into the luminance 1,000 cd/m$^2$ by the above-mentioned conversion. Therefore 1,000 cd/m$^2$ is determined as the frame peak luminance.

Then the graphic generation unit 108 calculates the product of a number of pixels and the luminance after the conversion (a number of pixels×luminance) for each gradation value, and calculates the total of the calculation results (multiplication values). Thereby the total of the luminance of all the pixels is determined. Then the graphic generation unit 108 calculates the frame average luminance by dividing the total of the luminance of all the pixels by a total number of pixels (total luminance of all the pixels/total number of pixels). In the example in FIG. 8, 500 cd/m² is calculated as the frame average luminance by:

$$1{,}036{,}800 \text{ pixels} \times 1{,}000 \text{ cd/m}^2 + 1{,}036{,}800 \text{ pixels} \times 0 \text{ cd/m}^2 / 2{,}073{,}600 \text{ pixels}.$$

Here the description of FIG. 7 continues. In step S702, the graphic generation unit 108 determines whether the setting information of the setting item "distribution display" in FIG. 6 is "ON" or not. If "ON", processing advances to S703. If "OFF", the luminance distribution is not drawn in the graph, and this processing flow ends.

In step S703, the graphic generation unit 108 determines whether coloring with the conversion colors of the false color function is performed or not based on the setting information of the setting item "false color coloring" in FIG. 6 and enable/disable of the false color function. Processing advances to step S704 if the coloring with the conversion colors is performed, or processing advances to step S705 if the coloring with the conversion colors is not performed. In concrete terms, processing advances to step S704 when the setting information of the setting item "false color coloring" in FIG. 6 is "ON", and when the setting information of the setting item "false color coloring" is "false color interlocking" and the false color function is enabled. Processing advances to S705 when the setting information of the setting item "false color coloring" is "false color interlocking" and the false color function is disabled, and when the setting information of the setting item "false color coloring" is "OFF".

In step S704, the graphic generation unit 108 draws the luminance distribution of the target frame image data in the graph based on the color information (correspondence between the luminance and the conversion color) outputted by the display control unit 106 and the conversion result in step S701 (a number of pixels of each luminance). In concrete terms, the graphic generation unit 108 illustrates the luminance distribution by coloring with the conversion colors of the false color function. Thereby the graphic image, as illustrated in FIG. 5B, is generated and displayed.

In step S705, the graphic generation unit 108 determines whether the setting information of the setting item "outside range coloring" in FIG. 6 is "ON" or not. Processing advances to step S706 if "ON", or to step S707 if "OFF".

In step S706, the graphic generation unit 108 draws the luminance distribution of the target frame image data in the graph based on the HDR range outputted by the display control unit 106 and the conversion result in step S701 (a number of pixels of each luminance). In concrete terms, the graphic generation unit 108 illustrates the luminance distribution by coloring outside the HDR range. Thereby the graphic image, as illustrated in FIG. 5A, is generated and displayed.

In step S707, the graphic generation unit 108 draws the luminance distribution of the target frame image data in the graph without coloring based on the conversion result in step S701 (a number of pixels of each luminance). Thereby the graphic image, as illustrated in FIG. 4, is generated and displayed.

In the example described above, the graph is updated for each frame by drawing (adding) the frame peak luminance, the frame average luminance and the luminance distribution for each frame, but the present invention is not limited to this. For example, the graph may be updated every two frames by drawing (adding) the frame peak luminance, the frame average luminance and the luminance distribution every two frames. Thereby an update frequency of the graph and a drawing amount of information can be decreased. In this case, the frame peak luminance, the frame average luminance and the luminance distribution may be skipped every two frames. In other words, the frame peak luminance, the frame average luminance and the luminance distribution may be information corresponding to one frame. Further, the frame peak luminance, the frame average luminance and the luminance distribution may be the average of the information corresponding to two frames.

In the example described above, the 10-bit target moving image data is analyzed at 10-bit precision, but 10-bit target moving data may be analyzed at a precision that is lower than 10-bit. For example, a number of pixels of the gradation values 0 to 3, a number of pixels of the gradation values 4 to 6 and the like may be counted at 8-bit prevision.

In the example described above, the absolute luminance is used as the luminance level, but the luminance level is not limited to the absolute luminance. For example, a gradation value may be used as the luminance level. In this case, the peak gradation value (maximum gradation value) of the frame image may be determined as the frame peak luminance, and the average gradation level (average picture level: APL) of the frame image may be determined as the frame average luminance, without converting the gradation value into the luminance. A type of luminance level may be switched when necessary. If the setting to process the HDR image has been performed (e.g. a gradation curve of HLG or PQ has been set), the absolute luminance may be used as the luminance level. If the setting to process the SDR image has been performed (e.g. a gradation curve of gamma 2.2 has been set), the gradation value may be used as the luminance level.

In the example described above, the frame image data is acquired for each frame, and the graph is updated for each frame, but the present invention is not limited to this. For example, a moving image file (all of the target moving image data) may be acquired so that all of the frame image data is analyzed, and a graph, in which the luminance distribution of all the frame image data is drawn, is generated all at once. Further, only one moving image file may be acquired or a plurality of moving image files to be regenerated may be acquired sequentially. In the case of acquiring a plurality of moving image files, a graph that indicates the luminance distributions of the plurality of moving image files may be generated.

FIG. 9 is an example of a graph generated based on moving image files. FIG. 9 is a case where two moving image files titled "video_001.mov" and "video_002.mov" are continuously regenerated. In FIG. 9, the file names of the two moving image files are written on the time axis (time line). Here the frame peak luminance, the frame average luminance and the time change of the luminance distribution are indicated for the two moving image files respectively. By displaying this graph, the user can confirm the time change of the luminance distribution and the like of the plurality of moving image files, and easily (intuitively) recognize whether or not the plurality of moving image files can be switched and viewed appropriately when the moving image files are continuously regenerated. As a result, the user can appropriately edit each moving image file (efficiency of editing improves). The plurality of moving image files are a plurality of moving image files that are assumed to be linked to one moving image file.

In the example described above, the frame peak luminance, the frame average luminance and the pixel information are acquired by analyzing the target moving image data, but the present invention is not limited to this. If at least one out of the frame peak luminance, the frame average luminance and the pixel information is included in the metadata corresponding to the target moving image data, the information may be acquired from the metadata. In this case, the metadata may be the metadata attached to the target moving image data (metadata included in the target moving image data), or metadata independent from the target moving image data (metafile).

In the example described above, a number of pixels is indicated by the density, but only the present/absent of a pixel may be indicated by two values. For example, in the above-mentioned graph, the graph may be drawn at coordinates where corresponding pixels exist, and not be drawn at coordinates where corresponding pixels do not exist. The present/absent of a pixel may be determined as "present" if a number of pixels is at least a predetermined threshold, and as "absent" if a number of pixels is less than the threshold. For example, it may be determined that a pixel is "present" if a number of pixels is at least 10, and is "absent" if a number of pixels is less than 10. The predetermined threshold may be variable by the user setting.

As described above, according to this embodiment, the pixel information on the luminance (luminance level) of each pixel at each time position of the moving image can be acquired. Based on the pixel information, a graph indicating the presence absence or a number of corresponding pixels at each coordinate is generated as a graph having the time axis and the luminance axis (luminance level axis). Thereby the user can easily (intuitively) recognize the time change of the luminance level distribution during a relatively long period of time.

Each block of this embodiment (FIG. 1) may or may not be independent hardware. The functions of two or more blocks may be implemented by common hardware. Each of a plurality of functions of one block may be implemented by independent hardware respectively. Two or more functions of one block may be implemented by common hardware. Each block may or may not be implemented by hardware. For example, the apparatus may include a processor and a memory storing control programs. Then the functions of at least a part of the blocks of the apparatus may be implemented by the processor reading the control programs from the memory.

This embodiment (including the above-mentioned modifications) is merely an example, and configurations acquired by appropriately modifying or changing the configuration of this embodiment within the scope of the essence of the present invention are also included in the present invention.

According to this disclosure, the user can easily (intuitively) recognize the time change of the luminance level distribution during a relatively long period of time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-000549, filed on Jan. 7, 2019, which is hereby incorporated by reference herein in its entirety.

What is claimed is:

1. An information processing apparatus comprising at least one memory and at least one processor which function as:
   an acquisition unit configured to acquire gradation values of pixels of a high dynamic range (HDR) moving image; and
   a generation unit configured to generate, based on the gradation values and an information on correspondence between gradation values and absolute luminances, a graph including a first axis which indicates time positions of the HDR moving image and a second axis which indicates absolute luminances,
   wherein the generation unit
   sets, to a coordinate of the graph, any color among a plurality of colors based on a number of pixels having an absolute luminance corresponding to the coordinate at a time position corresponding to the coordinate, and
   wherein the plurality of colors includes a first color, a second color and a third color.

2. The information processing apparatus according to claim 1, wherein
   the generation unit sets, to a coordinate in which pixels having an absolute luminance corresponding to the coordinate exist at a time position corresponding to the coordinate, among coordinates of the graph, a color corresponding to a number of the pixels.

3. The information processing apparatus according to claim 1, wherein
   in a case where pixels having an absolute luminance corresponding to a coordinate of the graph exist at a time position corresponding to the coordinate, and the absolute luminance is out of a predetermined range, the generation unit sets, to the coordinate, a predetermined color which indicates out of a range.

4. The information processing apparatus according to claim 1, wherein
   the at least one memory and at least one processor further function as an image processing unit configured to convert a color of a pixel of the HDR moving image to a conversion color corresponding to an absolute luminance of the pixel, in a case where a false color function is enabled, and in a case where the false color function is enabled, and pixels having an absolute luminance corresponding to a coordinate of the graph exist at a time position corresponding to the coordinate, the generation unit sets, to the coordinate, a conversion color corresponding to the absolute luminance.

5. The information processing apparatus according to claim 1, wherein
the generation unit draws, in a graphic image which indicates the graph, a graph which indicates a time change a maximum absolute luminance of the HDR moving image.

6. The information processing apparatus according to claim 1, wherein
the generation unit draws, in a graphic image which indicates the graph, a graph which indicates a time change an average absolute luminance of the HDR moving image.

7. The information processing apparatus according to claim 1, wherein
in a case where the acquisition unit acquires gradation values of pixels of a standard dynamic range (SDR) moving image, the generation unit generates, based on the gradation values of the SDR moving image, the graph in which the second axis indicates gradation values instead of the absolute luminances.

8. The information processing apparatus according to claim 1, wherein
the generation unit sets the color to the coordinate so that as the number of pixels corresponding to the coordinate is larger, the color of the coordinate is closer to the first color, and the number of pixels corresponding to the coordinate is smaller, the color of the coordinate is closer to the second color.

9. The information processing apparatus according to claim 1, wherein
the first color, the second color, and the third color are colors that differ in at least one of hue, chroma, and lightness.

10. The information processing apparatus according to claim 9, wherein
the first color, the second color, and the third color are colors that differ only in lightness.

11. The information processing apparatus according to claim 9, wherein
each of the first color, the second color, and the third color is white, gray, or black.

12. The information processing apparatus according to claim 1, wherein
the acquisition unit acquires gradation values of pixels of each of a plurality of frames included in the HDR moving image.

13. The information processing apparatus according to claim 12, wherein
the generation unit determines, based on an image information of each of the plurality of frame images, the color of the coordinate of the graph, and
the image information is an information which indicates a number of pixels existing in the frame image for each of the gradation values.

14. An information processing apparatus comprising at least one memory and at least one processor which function as:
an acquisition unit configured to acquire an information on luminance levels of pixels of a moving image; and
a generation unit configured to generate, based on the information, a graph including a first axis which indicates time positions of the moving image and a second axis which indicates luminance levels,
wherein the generation unit
sets, to a coordinate of the graph, any color among a plurality of colors based on a number of pixels having a luminance level corresponding to the coordinate at a time position corresponding to the coordinate,
wherein the plurality of colors includes a first color, a second color and a third color, and
in a case where pixels having a luminance level corresponding to a coordinate of the graph exist at a time position corresponding to the coordinate, and the luminance level is out of a predetermined range, the generation unit sets, to the coordinate, a predetermined color which indicates out of a range.

15. The information processing apparatus according to claim 14, wherein
the at least one memory and at least one processor further function as a control unit configured to determine the predetermined range according to a user operation.

16. An information processing apparatus comprising at least one memory and at least one processor which function as:
an acquisition unit configured to acquire an information on luminance levels of pixels of a moving image;
a generation unit configured to generate, based on the information, a graph including a first axis which indicates time positions of the moving image and a second axis which indicates luminance levels; and
an image processing unit configured to convert a color of a pixel of the moving image to a conversion color corresponding to a luminance level of the pixel, in a case where a false color function is enabled,
wherein the generation unit
sets, to a coordinate of the graph, any color among a plurality of colors based on a number of pixels having a luminance level corresponding to the coordinate at a time position corresponding to the coordinate,
the plurality of colors includes a first color, a second color and a third color, and
in a case where the false color function is enabled, and pixels having a luminance level corresponding to a coordinate of the graph exist at a time position corresponding to the coordinate, the generation unit sets, to the coordinate, a conversion color corresponding to the luminance level.

17. A display apparatus comprising at least one memory and at least one processor which function as:
an acquisition unit configured to acquire a high dynamic range (HDR) moving image;
a generation unit configured to generate, based on gradation values of pixels of the HDR moving image and an information on correspondence between gradation values and absolute luminances, a graph including a first axis which indicates time positions of the HDR moving image and a second axis which indicates absolute luminances;
an image processing unit configured to execute a conversion processing in which gradation values of pixels of the HDR moving image are converted based on the information on the correspondence; and
a display unit configured to display a combined moving image obtained by combining an HDR moving image after the conversion processing and the graph,
wherein the generation unit
sets, to a coordinate of the graph, any color among a plurality of colors based on a number of pixels having an absolute luminance corresponding to the coordinate at a time position corresponding to the coordinate, and wherein the plurality of colors includes a first color, a second color and a third color.

18. A display apparatus comprising at least one memory and at least one processor which function as:
   an acquisition unit configured to acquire a moving image;
   a generation unit configured to generate, based on an information on luminance levels of pixels of the moving image, a graph including a first axis which indicates time positions of the moving image and a second axis which indicates luminance levels;
   an image processing unit configured to execute a compression processing in which a range of luminance levels of the moving image is compressed to a predetermined range; and
   a display unit configured to display a combined moving image obtained by combining a moving image after the compression processing and the graph,
   wherein the generation unit
   sets, to a coordinate of the graph, any color among a plurality of colors based on a number of pixels having a luminance level corresponding to the coordinate at a time position corresponding to the coordinate,
   the plurality of colors includes a first color, a second color, and a third color, and
   in a case where pixels having a luminance level corresponding to a coordinate of the graph exist at a time position corresponding to the coordinate, and the luminance level is out of the predetermined range, the generation unit sets, to the coordinate, a predetermined color which indicates out of a range.

19. A display apparatus comprising at least one memory and at least one processor which function as:
   an acquisition unit configured to acquire a moving image;
   a generation unit configured to generate, based on an information on luminance levels of pixels of the moving image, a graph including a first axis which indicates time positions of the moving image and a second axis which indicates luminance levels;
   an image processing unit configured to execute a conversion processing in which a color of a pixel of the moving image is converted to a conversion color corresponding to a luminance level of the pixel, in a case where a false color function is enabled; and
   a display unit configured to display a combined moving image obtained by combining a moving image after the conversion processing and the graph,
   wherein the generation unit
   sets, to a coordinate of the graph, any color among a plurality of colors based on a number of pixels having a luminance level corresponding to the coordinate at a time position corresponding to the coordinate,
   the plurality of colors includes a first color, a second color, and a third color, and
   in a case where the false color function is enabled, and pixels having a luminance level corresponding to a coordinate of the graph exist at a time position corresponding to the coordinate, the generation unit sets, to the coordinate, a conversion color corresponding to the luminance level.

20. An information processing method comprising:
   acquiring gradation values of pixels of a high dynamic range (HDR) moving image; and
   generating, based on the gradation values and an information on correspondence between gradation values and absolute luminances, a graph including a first axis which indicates time positions of the HDR moving image and a second axis which indicates absolute luminances,
   wherein
   any color among a plurality of colors is set to coordinate of the graph based on a number of pixels having an absolute luminance corresponding to the coordinate at a time position corresponding to the coordinate, and
   wherein the plurality of colors includes a first color, a second color, and a third color.

21. An information processing method comprising:
   acquiring an information on luminance levels of pixels of a moving image; and
   generating, based on the information, a graph including a first axis which indicates time positions of the moving image and a second axis which indicates luminance levels,
   wherein
   any color among a plurality of colors is set to a coordinate of the graph based on a number of pixels having a luminance level corresponding to the coordinate at a time position corresponding to the coordinate,
   the plurality of colors includes a first color, a second color, and a third color, and
   in a case where pixels having a luminance level corresponding to a coordinate of the graph exist at a time position corresponding to the coordinate, and the luminance level is out of a predetermined range, a predetermined color which indicates out of a range is set to the coordinate.

22. An information processing method comprising:
   acquiring an information on luminance levels of pixels of a moving image;
   generating, based on the information, a graph including a first axis which indicates time positions of the moving image and a second axis which indicates luminance levels; and
   converting a color of a pixel of the moving image to a conversion color corresponding to a luminance level of the pixel, in a case where a false color function is enabled,
   wherein
   any color among a plurality of colors is set to a coordinate of the graph based on a number of pixels having a luminance level corresponding to the coordinate at a time position corresponding to the coordinate,
   the plurality of colors includes a first color, a second color, and a third color, and
   in a case where the false color function is enabled, and pixels having a luminance level corresponding to a coordinate of the graph exist at a time position corresponding to the coordinate, a conversion color corresponding to the luminance level is set to the coordinate.

23. A non-transitory computer readable medium that stores a program, wherein the program causes a computer to execute an information processing method comprising:
   acquiring gradation values of pixels of a high dynamic range (HDR) moving image; and
   generating, based on the gradation values and an information on correspondence between gradation values and absolute luminances, a graph including a first axis which indicates time positions of the HDR moving image and a second axis which indicates absolute luminances,
   wherein
   any color among a plurality of colors is set to a coordinate of the graph based on a number of pixels having an absolute luminance corresponding to the coordinate at a time position corresponding to the coordinate, and wherein the plurality of colors includes a first color, a second color, and a third color.

24. A non-transitory computer readable medium that stores a program, wherein the program causes a computer to execute an information processing method comprising:

acquiring an information on luminance levels of pixels of a moving image; and generating, based on the information, a graph including a first axis which indicates time positions of the moving image and a second axis which indicates luminance levels, wherein any color among a plurality of colors is set to a coordinate of the graph based on a number of pixels having a luminance level corresponding to the coordinate at a time position corresponding to the coordinate, the plurality of colors includes a first color, a second color, and a third color, and in a case where pixels having a luminance level corresponding to a coordinate of the graph exist at a time position corresponding to the coordinate, and the luminance level is out of a predetermined range, a predetermined color which indicates out of a range is set to the coordinate.

25. A non-transitory computer readable medium that stores a program, wherein the program causes a computer to execute an information processing method comprising:

acquiring an information on luminance levels of pixels of a moving image;

generating, based on the information, a graph including a first axis which indicates time positions of the moving image and a second axis which indicates luminance levels; and converting a color of a pixel of the moving image to a conversion color corresponding to a luminance level of the pixel, in a case where a false color function is enabled, wherein any color among a plurality of colors is set to a coordinate of the graph based on a number of pixels having a luminance level corresponding to the coordinate at a time position corresponding to the coordinate, the plurality of colors includes a first color, a second color, and a third color, and in a case where the false color function is enabled, and pixels having a luminance level corresponding to a coordinate of the graph exist at a time position corresponding to the coordinate, a conversion color corresponding to the luminance level is set to the coordinate.

* * * * *